United States Patent
Mellert

(10) Patent No.: US 7,934,426 B2
(45) Date of Patent: May 3, 2011

(54) MEASUREMENT CELL SYSTEM, IN PARTICULAR PRESSURE MEASUREMENT CELL SYSTEM

(75) Inventor: Martin Mellert, Steinach (DE)

(73) Assignee: Vega Grieshaber KG, Wolfach (DE)

(*) Notice: Subject to any disclaimer, the term of this patent is extended or adjusted under 35 U.S.C. 154(b) by 0 days.

(21) Appl. No.: 12/076,804

(22) Filed: Mar. 24, 2008

(65) Prior Publication Data

US 2008/0236289 A1    Oct. 2, 2008

Related U.S. Application Data

(60) Provisional application No. 60/907,697, filed on Apr. 13, 2007.

(30) Foreign Application Priority Data

Mar. 26, 2007    (DE) .................... 10 2007 014 898

(51) Int. Cl.
*G01L 7/00*    (2006.01)

(52) U.S. Cl. ........................................................ 73/714
(58) Field of Classification Search ............ 73/700–756
See application file for complete search history.

(56) References Cited

U.S. PATENT DOCUMENTS 5,948,962 A    9/1999    Matthiessen

FOREIGN PATENT DOCUMENTS

| DE | 41 04 056 | 7/1992 |
|---|---|---|
| DE | 197 32 546 | 12/1998 |
| DE | 100 20 064 | 12/2000 |
| DE | 11 2004 000 430 | 3/2006 |
| EP | 1 302 755 | 4/2003 |
| EP | 1 550 852 A2 | 7/2005 |

*Primary Examiner* — Andre J Allen
(74) *Attorney, Agent, or Firm* — The Nath Law Group; Jerald L. Meyer; Sungyeop Chung

(57) ABSTRACT

The invention relates to a measurement cell system, in particular a pressure measurement cell system, comprising a measurement cell and a memory unit containing at least one stored measurement cell-based stored value. The measurement cell together with the memory unit are designed as a separately operable unit.

11 Claims, 1 Drawing Sheet

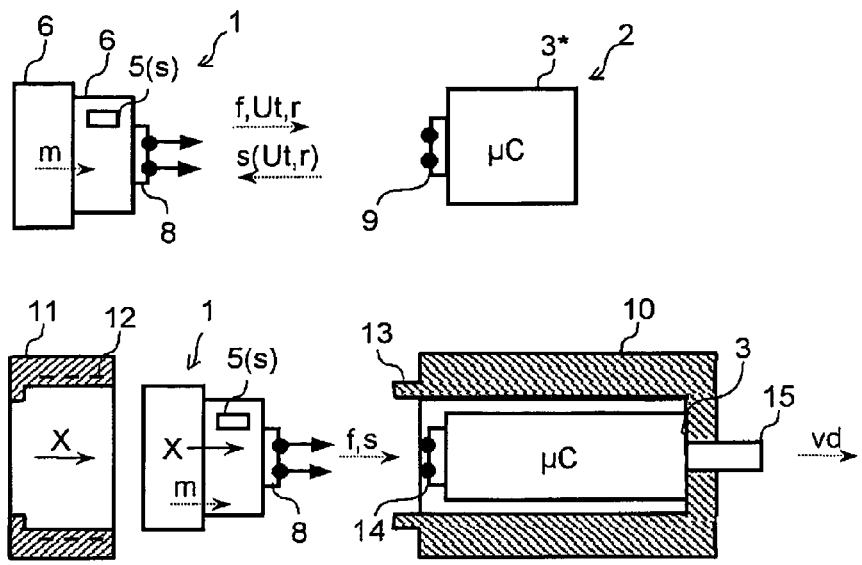
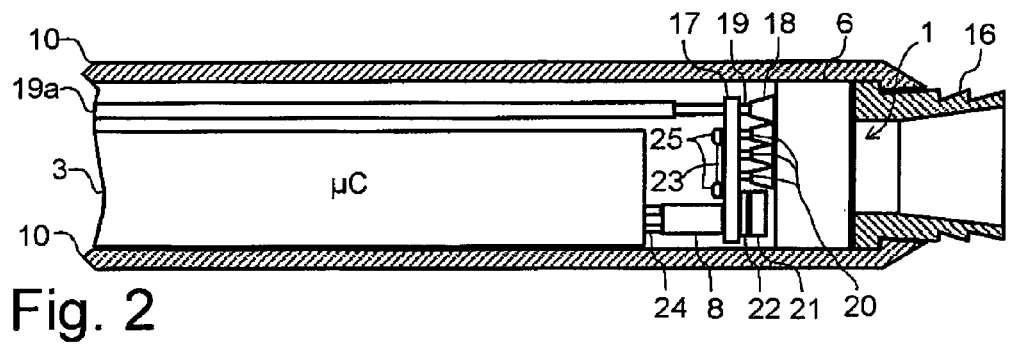
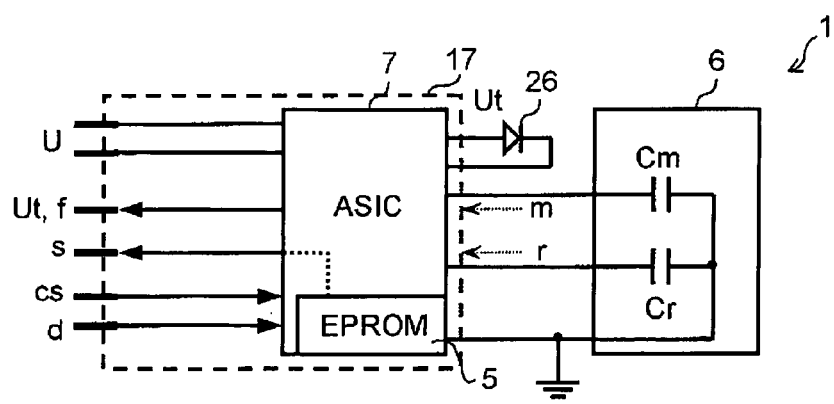

MEASUREMENT CELL SYSTEM, IN PARTICULAR PRESSURE MEASUREMENT CELL SYSTEM

This application claims the benefit of prior U.S. Provisional Patent Application No. 60/907,697 filed Apr. 13, 2007, the contents of which are hereby incorporated in their entirety.

The invention relates to a measurement cell system, in particular a pressure measurement cell system.

A common measuring device for pressure measurements in a line or a hopper, for example, comprises a housing having an integrated electronic unit, and on the end face, a measurement cell system having a measurement cell. Measured values from the measurement cell are sent to the electronic unit and processed by same in order to output processed data via an external interface.

Due to manufacturing tolerances and errors in the manufacture of the measurement cell system, after manufacture it is customary in a first step to determine parameters and/or measured values for the measurement cell system. If the parameters and measured values are within an allowable tolerance range, the measurement cell system is then provided, in particular incorporated, in a housing of a measuring device for subsequent use. In the incorporation a distinction is sometimes made according to measurement cell systems of various qualities, so that the measurement cell systems of lower quality are kept separate from the measurement cell systems of higher quality.

At a subsequent second point in time, measurement cell systems thus prepared are then inserted into the housing of a measuring device and connected to the electronic unit or control device for the measuring device. In addition, a new second measurement of measured values and/or parameters for the measurement cell is performed in order to provide a measurement cell-based stored value as a correction value for correcting measured values or data obtained therefrom as a function of a specific parameter for this specialized measurement cell system thus determined, and in subsequent measurement operations to allow use in the control device for providing the processed and thus corrected data. Such a measurement cell-based stored value is then stored in a memory in the housing of the measuring device which is associated with the electronic unit of the measuring device.

In such a procedure it is disadvantageous that each measurement cell or measurement cell system is ultimately measured twice with respect to a measured value or parameter: a first time for a preselection or screening of the measurement cell system, and a second time for determining correction values for this measurement cell system.

The object of the invention is to provide a measurement cell system, in particular a pressure measurement cell system, which may be inserted into a measuring device with less complexity.

This object is achieved by use of a measurement cell system, in particular a pressure measurement cell system, having the features of Claim 1.

Advantageous embodiments are the subject matter of the dependent claims.

Accordingly, preferred is a measurement cell system, in particular a capacitive pressure measurement cell system, comprising a measurement cell and a memory unit in which at least one measurement cell-based stored value is stored. The measurement cell together with the memory unit is designed as a separately operable unit.

The memory unit is preferably permanently affixed to the measurement cell. The memory unit is advantageously permanently affixed to the measurement cell via a printed circuit board. The memory unit is preferably situated compactly in the free space which is usually available between the printed circuit board and the measurement cell.

The measurement cell system preferably contains an integrated circuit which is designed and/or programmable for storing the at least one measurement cell-based stored value in the memory unit and/or for reading the at least one measurement cell-based stored value from the memory unit. In particular, data that are stored or to be stored may thus be processed, and the memory unit may be accessed in a targeted manner. The memory unit may be easily accommodated directly in the integrated circuit.

The integrated circuit may have a processor or a control device for higher-order processing as well, in particular for providing data obtained from the measurement data from the measurement cell. Thus, for example, instead of capacitive measured values or measurement data, frequency values provided by the control device may be outputted by the measurement cell system.

The measurement cell system is preferably directly provided with a temperature measuring device for providing a temperature value as a function of a temperature in the vicinity of the measurement cell, for directly generating the at least one measurement cell-based stored value or for providing a reference value by means of which an external control device may determine and provide such a measurement cell-based stored value.

The measurement cell system is provided in a customary manner with an interface for transmitting data between the memory unit and an external device, whereby in addition to strictly measurement data the measurement cell-based stored value may also be transmitted. The external device is preferably designed as a processor or a control device for providing processed measurement data by means of the at least one measurement cell-based stored value and/or by means of measurement data originating from the measurement cell or data obtained from the measurement data.

The measurement cell may also advantageously be provided with an outer diameter less than 40 mm, preferably less than 25 mm.

Accordingly, also independently preferred is a method for providing such a measurement cell system, wherein after the measurement cell system is manufactured, parameters and/or measured values for the measurement cell system are determined and the measurement cell system is subsequently provided, in particular incorporated, in a housing of a measuring device for subsequent use, and after the measured values and/or parameters are determined the at least one measurement cell-based stored value is provided as a function of the measured values and/or parameters and is stored in the memory unit for the measurement cell system.

Accordingly, independently preferred is a measuring device, in particular a pressure measuring device, having such a measurement cell system which is inserted or insertable, an interface for transmitting measurement data and at least one measurement cell-based stored value from the memory unit of a measurement cell system inserted in this manner, and a processor or a control device for providing processed measurement data by use of the at least one measurement cell-based stored value and by use of the measurement data originating from the measurement cell for the measurement cell system or data obtained from the measurement data.

Accordingly, also preferred is such a measurement cell system, such a programming device, such a method, or such a measuring device, wherein the at least one measurement cell-based stored value is a correction value for correcting measured values or data obtained therefrom as a function of at least one specific parameter for this measurement cell system with respect to other measurement cell systems of the same type.

Accordingly, also preferred is such a measurement cell system, such a programming device, such a method, or such a measuring device, wherein the at least one measurement cell-based stored value is an adjustment value for adjusting measured values or data obtained therefrom as a function of at least one specific parameter for this measurement cell system with respect to another type of measurement cell system.

Such a measurement cell system in conjunction with the procedure, as well as the manufacture of such a measuring device, are advantageous in particular due to the fact that a work step may be omitted after manufacture. Instead of having to measure the measurement cell or its specific parameters twice, a first time for screening of defective measurement cells and a second time in conjunction with the installation in a measuring device, only a single measurement operation is necessary with regard to at least one typical measured value or parameter. By use of an appropriate test device which at the same time is designed as a programming device, not only are the characteristic measured values and parameters of the measurement cell system determined by the completed measurement cell system in a manner known as such, but in addition, corresponding measurement cell-based stored values are calculated which are stored in a memory permanently associated with the measurement cell. Upon subsequent installation in a measuring device, the control device for the measuring device is then able to read such stored values and use them directly as correction values or as values for measurement cell-specific processing of measured values. Alternatively or additionally, after the installation in a measuring device such measurement cell-based stored values may be transmitted to a memory which is associated with the electronic unit or control device for the measuring device.

One exemplary embodiment is explained in greater detail below with reference to the drawings. In the various figures, identical reference numerals are used for corresponding components and data or equivalent components and data, in this regard reference also being made to the explanations for the respective other figures.

FIG. 1 shows at the top left a measurement cell system having a manufactured measurement cell which is to be tested for characteristic measurement cell parameters by means of a testing and programming device illustrated on the right side, and therebelow a measurement cell system in an intermediate step during installation in a measuring device;

FIG. 2 shows the detailed illustration of another measurement cell which is inserted into a measuring device; and FIG. 3 shows individual components of such a measurement cell system.

As shown in FIG. 1, in a first manufacturing step a measurement cell system 1 is fabricated, and after manufacture, characteristic measurement data m and other parameters Ut, r, or data f produced from the measurement data m are tested and analyzed by means of a testing and programming device. The programming device 2 of the testing and programming device determines at least one measurement cell-based stored value s which can subsequently be used by a control device 3 for a measuring device 4.

The programming device 2 correspondingly stores the measurement cell-based stored value s, optionally by use of a logic control system for the measurement cell system 1, in a memory unit 5 which is permanently connected to other components of the measurement cell system 1.

In particular, the memory unit 5 is thus in a fixed spatial connection or relationship with a measurement cell 6 for the measurement cell system 1. The measurement cell 6 is particularly preferably a pressure measurement cell, although in principle other types of measurement cells may thus be provided with a suitable memory unit.

The memory unit 5 is preferably designed as a component or as a permanent connection to an integrated circuit 7 or logic control system so that, if needed, required preprocessing of measurement data m and measurement cell-based stored values s may also be performed.

For transmission of the measurement data m or data f obtained therefrom, as well as optional temperature values Ut or other parameters such as a reference value r, the measurement cell system 1 has an interface 8 which may be connected to a suitable interface 9 of the testing and programming device 2 for communicating appropriate data and parameters.

After a measurement cell system 1 prepared in this manner has been provided with at least one measurement cell-based stored value s in the memory unit 5, it may be provided, in particular incorporated, for subsequent use. At a later time this measurement cell system 1 is then provided for installation in the measuring device 4.

The measuring device 4 is customarily composed of a housing 10 having an opening in the front side in which the measurement cell system 1 may be inserted. After insertion, the measurement cell system 1 is fixed in place by a front-side clamping device 11, for example, which is designed to enclose the measurement cell system 1 and which may be screwed on, for example by means of a thread 12 on a housing thread 13.

By means of the interface 8 for the measurement cell system 1, the measurement cell system 1 is connected to an interface 14, associated with the control device 3, situated in the rear region of the measuring device 4. In this manner measurement data m, data f obtained from the measurement data m, other parameters such as temperature values Ut or reference values r, and in particular also the at least one measurement cell-based stored value s, may be transmitted from the measurement cell system to the control device 3, μC. The control device 3 may thus directly make corrections or other data adjustments without the need for calibration or the like of the inserted measurement cell system 1 in a further work step. Appropriately processed data vd may thus be directly outputted as corrected measurement data m from the measuring device 4 to an additional device via an external interface 15.

FIG. 2 shows another example of a system having a measurement cell system 1, identical reference numerals being used for corresponding components and data or equivalent components and data, in this regard reference also being made to the explanations for FIG. 1.

The measurement cell system 1 is once again inserted into the front side of a housing 10, wherein at the front side of the measurement cell 6 a cone 16 is inserted which projects from the front side of the housing 10.

A printed circuit board 17 is situated at the back side of and at a distance from the measurement cell 6, the printed circuit board 17 preferably having an outer circumference comparable to that of the measurement cell 6. In the case of a circular measurement cell 6 the printed circuit board 17 also preferably has a circular design.

The distance of the printed circuit board 17 from the back side of the measurement cell 6 is used in particular to provide space for connecting elements 18 via which a ventilation tube 19 and conductors 20 are fastened to the measurement cell 6, i.e., relative to the measurement cell housing. The ventilation tube 19 preferably is guided past the printed circuit board or is passed through an opening in the printed circuit board 17, and is connected in a manner known as such to a rear ventilation device for the measuring device 4 via a further ventilation tube 19a. The memory unit is preferably correspondingly situated in a spatial region between the printed circuit board 17 and the back side of the measurement cell 6, but may also be provided at the back side of the printed circuit board 17.

In the preferred embodiment illustrated, the memory unit is accommodated in an integrated circuit 21 which is connected to the printed circuit board 17 via a base 22 or optionally also in the form of a surface-mounted component. The integrated circuit 21 is connected to the conductors 20 and to an interface 8 and conductors 24 for the interface 8 via printed conductors 23. The printed conductors 23 are contacted with the conductors 20 by the optional use of float pads 25. The interface 8 preferably projects away from the rear of the printed circuit board 17 in the direction of a control device 3, μC which is accommodated at the rear of the housing 10.

FIG. 3 shows an example of a configuration of components of such a measurement cell system 1. The front side of the measurement cell 6 is illustrated, which provides a capacitance value Cm as the measured value m. A reference value r in the form of a capacitance reference value Cr is also provided. The two capacitive variables are switched in parallel, for example, and at their end facing away from the measurement cell 6 are connected to the integrated circuit 7, and at their other end are connected to ground or to an appropriate connection. The ground connection is preferably likewise connected to the integrated circuit 7. In the embodiment illustrated, the integrated circuit 7 is designed as an application-specific ASIC integrated circuit by way of example. In principle, however, simple logical connections may be established on a printed circuit board 17.

Also illustrated is a thermocouple as a temperature measuring device 26 for determining a temperature value Ut in the vicinity of the measurement cell 6 to allow the instantaneous temperatures acting on the pressure measurement cell, and thus the measured values m thereof, to be determined. The temperature measuring device 26, implemented in the form of a customary diode circuit, for example, is likewise preferably directly connected to the integrated circuit 7.

The integrated circuit 7 also preferably includes a memory section which is provided as the memory unit 5. In addition, or provided as this memory unit 5, an erasable programmable read-only memory (EPROM) may be a component of the integrated circuit or may also be provided as an independent component.

In the case of the integrated circuit 7 by way of example, this integrated circuit is preferably connected to a plurality of conductors which form the interface 8. Thus, conductors for applying an operating voltage U are provided. In addition, one or more conductors for transmitting measured values or measurement data m of the measurement cell 6 or data f obtained therefrom are usually provided. In the case of the data f obtained therefrom, these data are frequency values, for example, which are determined by the integrated circuit 7 from the actual measurement data m or are determined corresponding to same. Thus, in such a case a frequency value f or frequency data value instead of a capacitive measurement data value Cm is outputted to the downstream control device 3. In the interface 8 additional inputs and outputs are provided by conductors used separately or jointly in order to communicate, for example, a chip selection signal cs, at least one measurement cell-related stored value s, and/or data between the integrated circuit 7 and a testing and programming device 2 or control device 3 connected thereto.

Modified designs may also be implemented. Thus, other values may also be stored in the memory unit 5 for the measurement cell system 1, in particular serial numbers, model identifiers, and quality information.

The invention claimed is:

1. Measurement cell system (1), in particular a pressure measurement cell system, comprising:
   a measurement cell (6); and
   a memory unit (5) containing at least one stored measurement cell-based stored value (s), the measurement cell (6) together with the memory unit (5) being designed as a separately operable unit, wherein:
   the memory unit (5) comprises measurement-cell based correction values for correcting measuring data of said measurement cell (6), whereby said correction values are provided by a test and test programming device, and
   the memory unit (5) is connected via an interface (8) with a control device (3) which outputs said corrected measuring data.

2. Measurement cell system according to claim 1, wherein the memory unit (5) is permanently affixed to the measurement cell (6).

3. Measurement cell system according to claim 1, wherein the memory unit (5) is permanently affixed to the measurement cell (6) via a printed circuit board (17).

4. Measurement cell system according to claim 3, wherein the memory unit (5) is situated between the printed circuit board (17) and the measurement cell (6).

5. Measurement cell system according to claim 1, containing an integrated circuit (7) which is designed and/or programmable for storing the at least one measurement cell-based stored value (s) in the memory unit (5) and/or for reading the at least one measurement cell-based stored value from the memory unit (5).

6. Measurement cell system according to claim 5, wherein the memory unit (5) is accommodated in the integrated circuit (7).

7. Measurement cell system according to claim 5, wherein the integrated circuit (7) has a processor or a control device for providing data (f) obtained from the measurement data (m) of the measurement cell (6).

8. Measurement cell system according to a preceding claim, containing a temperature measuring device (26) for providing a temperature value (Ut) as a function of a temperature in the vicinity of the measurement cell (6), for generating the at least one measurement cell-based stored value (s).

9. Measurement cell system according to claim 1, containing an interface (8) for transmitting data between the memory unit (5) and an external device.

10. Measurement cell system according to claim 9, wherein the external device is a processor of a control device (3, μC) for providing processed measurement data (vd) by means of the at least one measurement cell-based stored value (s) and/or by means of measurement data (m) originating from the measurement cell (6) or data (f) obtained from the measurement data (m).

11. Measurement cell system according to claim 1, wherein the measurement cell (6) has an outer diameter less than 40 mm, preferably less than 25 mm.

* * * * *